United States Patent
Iwano

(10) Patent No.: US 11,830,181 B2
(45) Date of Patent: Nov. 28, 2023

(54) INSPECTION SYSTEM, INFORMATION PROCESSING APPARATUS, AND CONTROL METHOD THEREOF

(71) Applicant: CANON KABUSHIKI KAISHA, Tokyo (JP)

(72) Inventor: Shunsuke Iwano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/157,552

(22) Filed: Jan. 20, 2023

(65) Prior Publication Data
US 2023/0153990 A1    May 18, 2023

Related U.S. Application Data

(63) Continuation of application No. 17/346,033, filed on Jun. 11, 2021, now Pat. No. 11,580,632.

(30) Foreign Application Priority Data

Jun. 17, 2020   (JP) ................................ 2020-104672

(51) Int. Cl.
G06T 7/00 (2017.01)
H04N 1/00 (2006.01)

(52) U.S. Cl.
CPC .......... *G06T 7/001* (2013.01); *H04N 1/00005* (2013.01); *H04N 1/00034* (2013.01); *H04N 1/00209* (2013.01); *G06T 2207/30144* (2013.01)

(58) Field of Classification Search
CPC .......... G06T 7/001; G06T 2207/30144; H04N 1/00005; H04N 1/00034; H04N 1/00209; G06F 3/1208; G06F 3/1268; G06F 3/1275; G06F 3/1279
See application file for complete search history.

(56) References Cited

U.S. PATENT DOCUMENTS

2020/0104987 A1*   4/2020   Nakano .............. H04N 1/00045

\* cited by examiner

*Primary Examiner* — Christopher Wait
(74) *Attorney, Agent, or Firm* — Canon U.S.A., Inc. IP Division

(57) ABSTRACT

In an inspection system including a printing apparatus, an inspection apparatus configured to inspect quality of a printed product printed by the printing apparatus, and an information processing apparatus configured to transmit a print job to the printing apparatus, the information processing apparatus transmits a print job to the printing apparatus in a case where a reference image to be used for inspecting the quality of the printed product corresponding to the print job is registered, and does not transmit the print job in a case where the reference image corresponding to the print job is not registered.

10 Claims, 20 Drawing Sheets

FIG.4

```xml
<?xml version="1.0" encoding="UTF-8"?>
<JDF ID="ID01" JobPartID="JobPartID01" Type="Combined"
Types="LayoutPreparation Imposition Interpreting Rendering DigitalPrinting"
Activation="Active" Status="Ready" Version="1.3" Category="DigitalPrinting"
ICSVersions="IDP_L1-1.0 Base_L1-1.0 MaxVersion="1.3"
xmlns="http://www.CIP4.org/JDFSchema_1_1"
xmlns:cj="http://www.canon.com/ns/CanonJDF"
JobID="JobID01" DescriptiveName="ProductAAA">                    ← 401
    <ResourcePool>                    ← 402
        <RunList Class="Parameter" ID="IDRL" Status="Available" PartIDKeys="Run">
            <RunList Run="0">
                <LayoutElement>
                    <FileSpec MimeType="application/pdf" URL="cid:Sample" TotalPage="300" ResourceUsage="Normal Brochure"/>   ← 403
                </LayoutElement>
            </RunList>
        </RunList>
        <DigitalPrintingParams Class="Parameter" ID="IDDPP" Status="Available"
            Collate="SheetSetAndJob">
            <MediaRef rRef="MED_000"/>
        </DigitalPrintingParams>
        <Media ID="MED_000" Class="Consumable" Status="Available" Dimension="842 1191" DescriptiveName="Media"/>
        <Component ID="COM_000" Class="Quantity" ComponentType="Final Product" Status="Unavailable"/>
    </ResourcePool>
    <ResourceLinkpool>
        <ComponentLink Usage="Output" rRef="COM_000" Amount="100"/>    ← 404
    </ResourceLinkpool>
</JDF>
```

FIG.5A

```xml
<?xml version="1.0" encoding="UTF-8"?>
```
500 ~ `<JobTicket>`
        `<PrinterName>color printer1</PrinterName>`
501 ~ `<JobID>ID01</JobID>`
502 ~ `<JobTypeID>ProductAAA</JobTypeID>`
503 ~ `<NumberOfCopies>100</NumberOfCopies>`
504 ~ `<NumberOfScan></NumberOfScan>`
505 ~ `<Collate>None</Collate>`
506 ~ `<MediaSize>842 1191</MediaSize>`
  `</JobTicket>`

FIG.5B

```xml
<?xml version="1.0" encoding="UTF-8"?>
```
510 ~ `<JobTicket>`
        `<PrinterName>color printer1</PrinterName>`
        `<JobID>IDO1</JobID>`
511 ~ `<JobTypeID>ProductAAA</JobTypeID>`
        `<Sheets>300</Sheets>`
        `<Sheet>`
            `<SheetNumber>1</SheetNumber>`
            `<Master Image>aaa0001.bmp</MasterImage>`
        `</Sheet>`
        `<Sheet>`
            `<SheetNumber>2</SheetNumber>`
            `<Master Image>aaa0002.bmp</MasterImage>`
        `</Sheet>`
        . . .
`</JobTicket>`

FIG.6

| JobTypeID | JobID | Master image registered |
|---|---|---|
| ProductAAA | ID001 | YES |
| ProductBBB | ID002 | YES |
| ProductCCC | ID003 | NO |
| ProductDDD | ID004 | NO |

| | | | | | | |
|---|---|---|---|---|---|---|
| Jobs | | | | | | |
| Edit ~701 | | 702~ Register master images | | | Print ~703 | |
| | | ~704 | | | ~711 | |
| JobID | Job Name | Number of copies | Media Size | Collate | Inspection | |
| ID001 | AAAA | 1000 | A3 | ON | ON | |
| ID002 | BBBB | 500 | A4 | ON | ON | |
| ID003 | CCCC | 1000 | A4 | ON | ON | |
| ID004 | DDDD | 200 | B5 | ON | OFF | |

| | | | | | |
|---|---|---|---|---|---|
| Jobs | | | | | |
| Edit ~701 | | 702~ Register master images | | Print ~703 | |
| | | ~704 | | ~711 | |
| JobID | Job Name | Number of copies | Media Size | Collate | Inspection |
| ID001 | AAAA | 1000 | A3 | ON | ON |
| ID002 | BBBB | 500 | A4 | ON | ON |
| ID003 | CCCC | 1000 | A4 | ON | ON |
| ID004 | DDDD | 200 | B5 | ON | OFF |

| | | | | | |
|---|---|---|---|---|---|
| Jobs | | | | | |
| Edit ~701 | | 702~ Register master images | | Print ~703 | |
| | | ~704 | | ~711 | |
| JobID | Job Name | Number of copies | Media Size | Collate | Inspection |
| ID001 | AAAA | 1000 | A3 | ON | ON |
| ID002 | BBBB | 500 | A4 | ON | ON |
| ID003 | CCCC | 1000 | A4 | ON | ON |
| ID004 | DDDD | 200 | B5 | ON | OFF |

| | | | | | |
|---|---|---|---|---|---|
| Jobs | | | | | |
| Edit ~701 | | 702~ Register master images | | Print ~703 | |
| | | ~704 | | ~711 | |
| JobID | Job Name | Number of copies | Media Size | Collate | Inspection |
| ID001 | AAAA | 1000 | A3 | ON | ON |
| ID002 | BBBB | 500 | A4 | ON | ON |
| ID003 | CCCC | 1000 | A4 | ON | ON |
| ID004 | DDDD | 200 | B5 | ON | OFF |

FIG.8A

Edit Job

- Job ID:ID001
- Name: AAA
- Number of copies: 100 copies
- Number of scan: 10 copies
- Media Size: A3 ▶
- Width: 842 mm
- Height: 1191 mm
- Collate: ● On  ○ Off
- Inspection: ● On  ○ Off

[ OK ]   [ Cancel ]

FIG.8B

Inspection Setting

- Name:AAA
- Number of copies: 100 copies
- Media Size: A3 ▶
- Width: 842 mm
- Height: 1191 mm
- Collate: ● On  ○ Off

[ Inspection area setting ]   [ OK ]

FIG.9

| Setting | Require |
|---|---|
| Number of Copies | FALSE |
| Media size | TRUE |
| Collate | TRUE |
| InspectionLevel | FALSE |
| InspectionArea | FALSE |

900 901

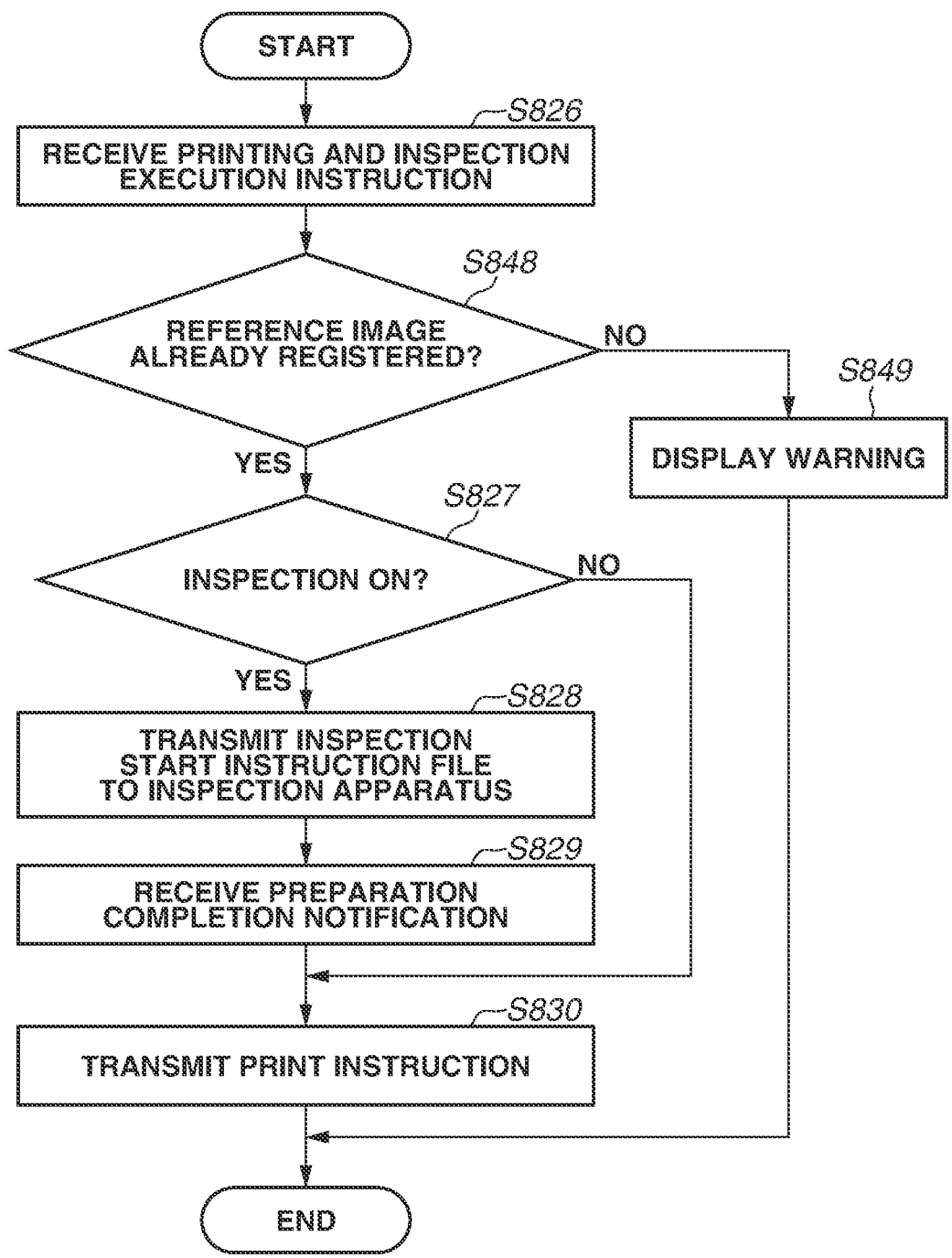

INSPECTION SYSTEM, INFORMATION PROCESSING APPARATUS, AND CONTROL METHOD THEREOF

CROSS-REFERENCE TO RELATED APPLICATIONS

This application is a Continuation of U.S. patent application Ser. No. 17/346,033, filed Jun. 11, 2021, which claims the benefit of Japanese Patent Application No. 2020-104672, filed Jun. 17, 2020, both of which are hereby incorporated by reference herein in their entirety.

BACKGROUND

Field of the Disclosure

The present disclosure relates to a technique for inspecting print quality of a printed product.

Description of the Related Art

Inspection systems, which read printed products printed by image forming apparatuses and inspect quality thereof, are known. The inspection system can detect an image defect such as dirt and print omission, an error in a character, bar code quality, and the like. A resultant product in which the above-described defect is detected is separated from a printed product without a defect by, for example, changing a sheet discharge destination.

Printed product inspection is divided into inspection preparation and inspection. In the inspection preparation, a reference image is registered by scanning a non-defective product. In the inspection, an image to be inspected obtained by scanning a printed product as an inspection sample is compared with the reference image, and an error in the printed product is detected.

According to Japanese Patent No. 5168651, a reference image is stored in a memory of a printing apparatus, and an error in a printed product is detected using the stored reference image.

However, in a case of the technique according to Japanese Patent No. 5168651, for example, if the reference image is forgotten to be registered, inspection can be executed. More specifically, there is an issue that even though the reference image used for the inspection is not registered, and thus the inspection cannot be correctly executed, printing for the inspection is started, and a printed product is output in a state where the inspection cannot be executed.

SUMMARY

Embodiments of the present disclosure are directed to an inspection system capable of preventing a printed product from being output in a state where inspection cannot be correctly executed because a reference image corresponding to the printed product is not registered.

According to embodiments of the present disclosure, an inspection system including a printing apparatus, an inspection apparatus configured to inspect quality of a printed product printed by the printing apparatus, and an information processing apparatus configured to transmit a print job to the printing apparatus, wherein the inspection apparatus includes a reception unit configured to receive a scanned image obtained by scanning the printed product printed by the printing apparatus from the printing apparatus, and an inspection unit configured to inspect quality of the printed product based on comparison of the received scanned image with a reference image, wherein the information processing apparatus includes a transmission unit configured to transmit a print job to the printing apparatus, and wherein the transmission unit transmits the print job in a case where a reference image to be used for inspecting the quality of the printed product corresponding to the print job is registered, and does not transmit the print job in a case where the reference image corresponding to the print job is not registered.

Further features of the present disclosure will become apparent from the following description of exemplary embodiments with reference to the attached drawings.

BRIEF DESCRIPTION OF THE DRAWINGS

FIG. 4 illustrates an example of a job according to a first exemplary embodiment.

FIGS. 5A and 5B illustrate examples of reference image registration instruction files according to the first exemplary embodiment.

FIG. 6 is a table indicating an example of information stored in a database for associating a printed product with a reference image according to the first exemplary embodiment FIGS. 7A, 7B, 7C, and 7D illustrate examples of screens according to the first exemplary embodiment.

FIGS. 8A and 8B illustrate examples of screens according to the first exemplary embodiment.

FIG. 9 is a table used for determining a completion of an inspection setting, according to a second exemplary embodiment.

FIG. 20 is a flowchart illustrating processing to be executed in a case where an execution of printing and an inspection is instructed, according to a modification of the first exemplary embodiment.

DESCRIPTION OF THE EMBODIMENTS

Various exemplary embodiments of the present disclosure will be described in detail below with reference to the attached drawings.

Figure 1:
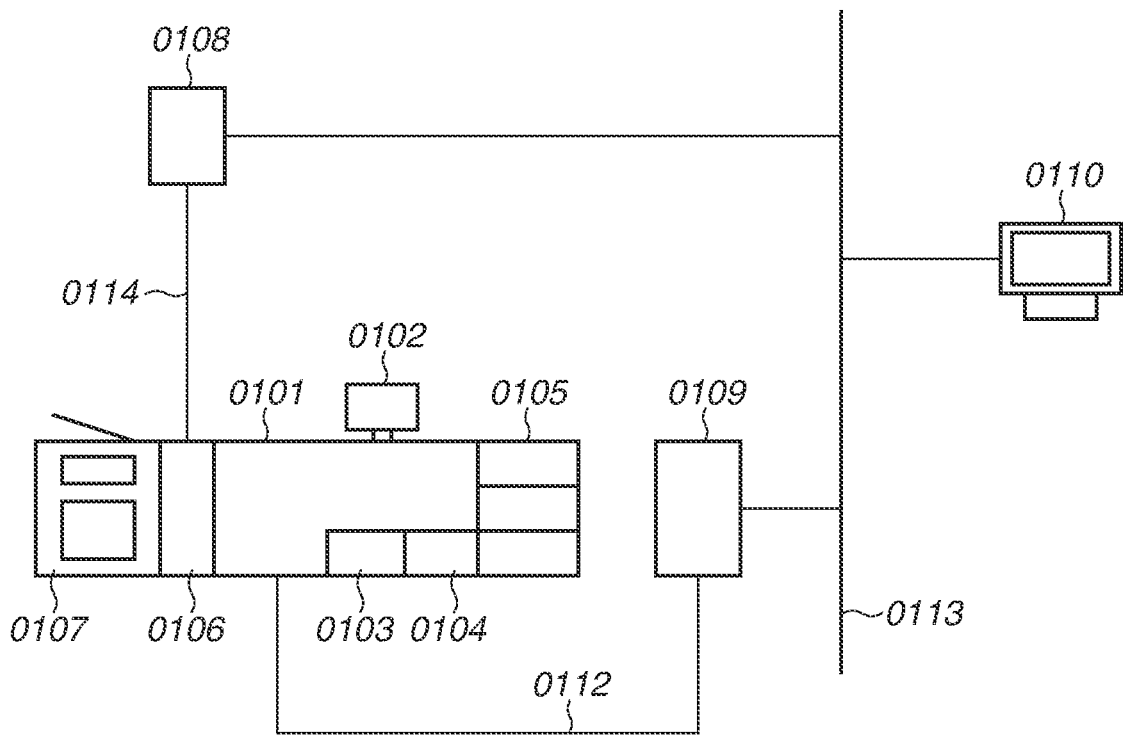
FIG. 1 is a schematic diagram illustrating a configuration of an information processing apparatus, an inspection apparatus, and an image forming apparatus.

FIG. 1 is a schematic diagram illustrating a configuration of an inspection system according to a first exemplary embodiment including an information processing apparatus, an inspection apparatus, and an image forming apparatus. The image forming apparatus according to the present exemplary embodiment is described using an electrophotographic method image forming apparatus, but may be an image forming apparatus using a different image forming method, such as an ink-jet method and an offset method.

An image forming apparatus 0101 is connected to an information processing apparatus 0109 via a cable 0112 and can communicate therewith. The information processing apparatus 0109 is connected to a client computer (information processing apparatus) 0110 and an inspection apparatus 0108 via a network 0113 and can communicate therewith.

The image forming apparatus 0101 includes a user interface (UI) panel 0102 and sheet feeding decks 0103 and 0104. The image forming apparatus 0101 is further connected with an option deck 0105 including sheet feeding decks with three stages. The image forming apparatus 0101 is, for example, an electrophotographic method image forming apparatus. The UI panel 0102 is a user interface provided with, for example, a capacitance type touch panel.

The image forming apparatus 0101 further includes an inspection unit 0106 and a large capacity stacker 0107. The inspection unit 0106 is connected to the inspection apparatus 0108 via a cable 0114. The large capacity stacker 0107 includes a main tray and a top tray, and thousands of sheets can be loaded on the main tray at a time.

A print job is generated by the client computer 0110, transmitted to the information processing apparatus 0109 via the network 0113, and managed in the information processing apparatus 0109. Then, the print job is transmitted from the information processing apparatus 0109 to the image forming apparatus 0101 via the cable 0112, and the image forming apparatus 0101 performs processing for printing the print job on a sheet. The print job may be generated and managed in the information processing apparatus 0109, transmitted to the image forming apparatus 0101 via the cable 0112, and managed in the image forming apparatus 0101.

The client computer 0110, the information processing apparatus 0109, and the inspection apparatus 0108 may be connected to the cable 0112 so as to be able to communicate with the image forming apparatus 0101. Thus, the connection form of the image forming apparatus 0101, the information processing apparatus 0109, and the client computer 0110 according to the present exemplary embodiment is an example, and various connection forms can be used in addition to the one according to the present exemplary embodiment.

Figure 2:
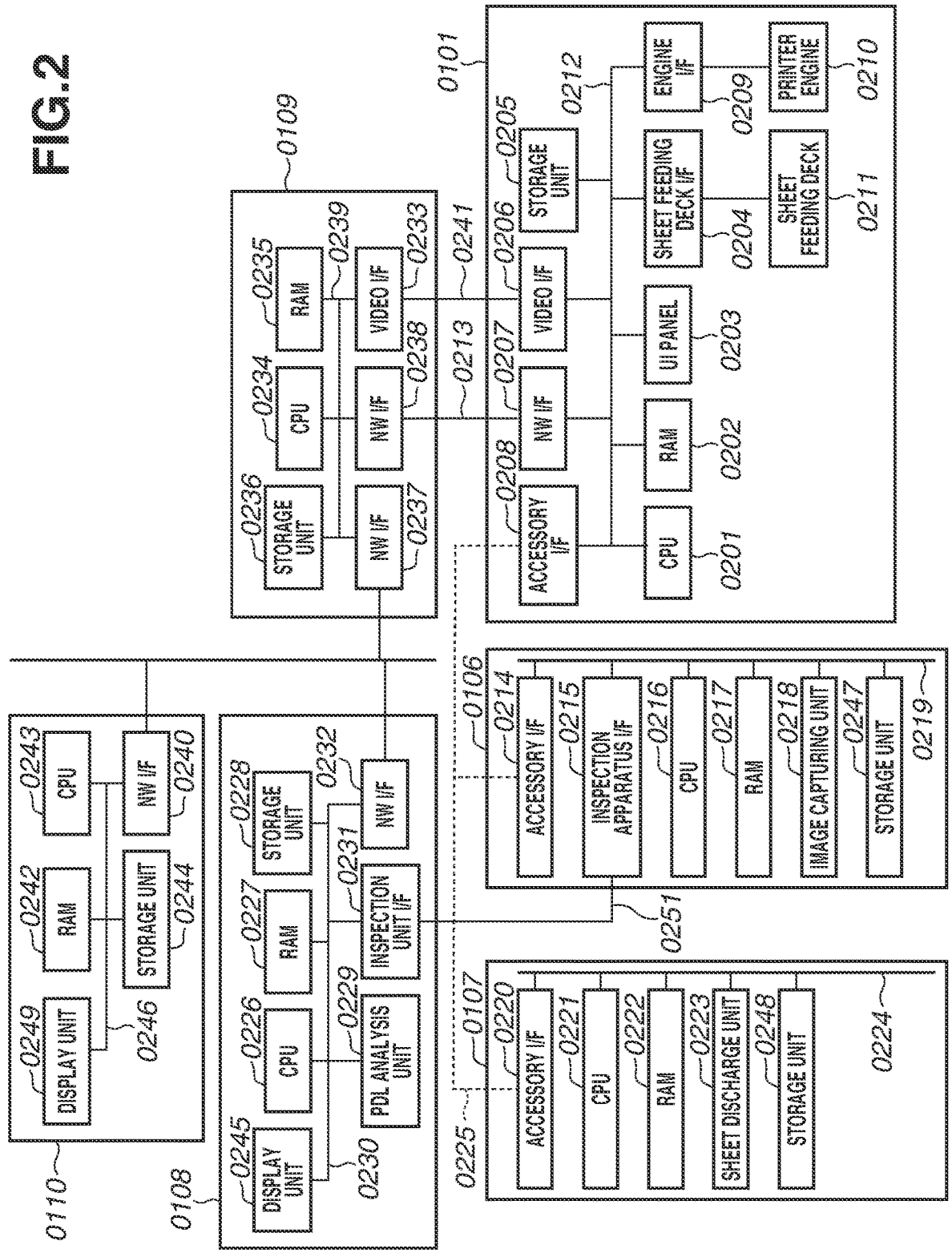
FIG. 2 is a block diagram illustrating the configuration of the information processing apparatus, the inspection apparatus, and the image forming apparatus.

FIG. 2 is a block diagram illustrating a control configuration of the image forming apparatus 0101, the inspection apparatus 0108, the large capacity stacker 0107, the information processing apparatus 0109, and the client computer 0110 according to the present exemplary embodiment.

A central processing unit (CPU) 0201 performs control and calculation on each unit in the image forming apparatus 0101 via a system bus 0212. The CPU 0201 controls execution of a program stored in a storage unit 0205 and loaded into a random access memory (RAM) 0202. The RAM 0202 is a type of a commonly used volatile storage device directly accessible from the CPU 0201 and used as a work area of the CPU 0201 or a temporary data storage area. The storage unit 0205 functions as a temporary storage area and a work memory at the time of an operation of the image forming apparatus 0101.

An engine interface (I/F) 0209 performs communication with and control on a printer engine 0210. A sheet feeding deck I/F 0204 performs communication with and control on a sheet feeding deck 0211. The sheet feeding deck 0211 is a general term for the sheet feeding decks 0103 and 0104 and the option deck 0105 as a hardware configuration. A UI panel 0203 is a hardware configuration of the UI panel 0102 and is a user interface for performing overall operations of the image forming apparatus 0101. According to the present exemplary embodiment, the UI panel 0203 includes a capacitance type touch panel.

A network interface (hereinbelow, referred to as NW I/F) 0207 is connected to a NW I/F 0238 of the information processing apparatus 0109 via a cable 0213 and controls communication between the information processing apparatus 0109 and the image forming apparatus 0101. In this example, the interfaces connected to the system buses 0212 and 0239 are directly connected to each other, but the information processing apparatus 0109 and the image forming apparatus 0101 may be connected to each other via, for example, a network, and a connection form thereof is not limited. A video I/F 0206 is connected to a video I/F 0233 via a video cable 0241 and controls communication of image data between the information processing apparatus 0109 and the image forming apparatus 0101.

A connection interface of the information processing apparatus 0109 to the image forming apparatus 0101 may be in a form in which functions of the NW I/F 0238 and the video I/F 0233 are integrated. Further, a connection interface of the image forming apparatus 0101 to the information processing apparatus 0109 may be in a form in which functions of the NW I/F 0207 and the video I/F 0206 are integrated.

An accessory I/F 0208 is connected to an accessory I/F 0214 and an accessory I/F 0220 via a cable 0225. In this way, the image forming apparatus 0101 communicates with the inspection unit 0106 and the large capacity stacker 0107 via the accessory I/Fs 0208, 0214, and 0220.

A CPU 0216 performs control and calculation on each unit in the inspection unit 0106 via a system bus 0219 and controls execution of a program stored in a storage unit 0247 and loaded into a RAM 0217. The RAM 0217 is a type of a commonly used volatile storage device directly accessible from the CPU 0216 and used as a work area of the CPU 0216 or a temporary data storage area. The storage unit 0247 functions as a temporary storage area and a work memory at the time of an operation of the inspection apparatus 0108. An inspection apparatus I/F 0215 is connected to an inspection unit I/F 0231 via a cable 0251. Thus, the inspection unit 0106 communicates with the inspection apparatus 0108 via the inspection apparatus I/F 0215 and the inspection unit I/F 0231.

An image capturing unit 0218 provided with, for example, a contact image sensor (hereinbelow, referred to as CIS) has an image capturing function, captures an image of a sheet passing through the inspection unit 0106, and transmits the captured image to the inspection apparatus 0108 via the inspection apparatus I/F 0215. The CIS of the image capturing unit 0218 is an example of a sensor, and the image capturing unit 0218 may use another type of a sensor such as a charge coupled device (CCD) image sensor without limiting an image capturing method.

A CPU 0221 performs control and calculation on each unit in the large capacity stacker 0107 via a system bus 0224 and controls execution of a program stored in a storage unit 0248 and loaded into a RAM 0222. The RAM 0222 is a type of a commonly used volatile storage device directly accessible from the CPU 0221 and used as a work area of the CPU 0221 or a temporary data storage area. The storage unit 0248 functions as a temporary storage area and a work memory at the time of the operation of the inspection apparatus 0108. A sheet discharge unit 0223 performs monitoring and control on a sheet discharge operation to the main tray and the top tray and a stacking status of each of the main tray and the top tray.

A CPU 0226 performs control and a calculation on each unit in the inspection apparatus 0108 via a system bus 0230 and controls execution of a program stored in a storage unit 0228 and loaded into a RAM 0227. The RAM 0227 is a type of a commonly used volatile storage device directly accessible from the CPU 0226 and used as a work area of the CPU 0226 or aa temporary data storage area. The storage unit 0228 functions as a temporary storage area and a work memory at the time of the operation of the inspection apparatus 0108. A page description language (PDL) analysis unit 0229 reads PDL data such as Portable Document Format (PDF) data, PostScript data, and page control language (PCL) data received from the client computer 0110 and the information processing apparatus 0109 and executes interpretation processing. A display unit 0245 is, for example, a liquid crystal display connected to the inspection apparatus 0108 and receives an input to the inspection apparatus 0108 from a user and displays a state of the inspection apparatus 0108.

A CPU 0234 performs control and calculation on each unit in the information processing apparatus 0109 via a system bus 0239 and controls execution of a program stored in a storage unit 0236 and loaded into a RAM 0235. The RAM 0235 is a type of a commonly used volatile storage device directly accessible from the CPU 0234 and used as a work area of the CPU 0234 or another temporary data storage area. The storage unit 0236 functions as a temporary storage area and a work memory at the time of an operation of the information processing apparatus 0109. A NW I/F 0237 is connected to NW I/Fs 0232 and 0240 via the network. The information processing apparatus 0109 communicates with the inspection apparatus 0108 via the NW I/Fs 0237 and 0232. Further, the information processing apparatus 0109 communicates with the client computer 0110 via the NW I/Fs 0237 and 0240.

A CPU 0243 performs control and calculation on each unit in the client computer 0110 via a system bus 0246 and controls execution of a program stored in a storage unit 0244 and loaded into a RAM 0242. The RAM 0242 is a type of a commonly used volatile storage device directly accessible from the CPU 0243 and used as a work area of the CPU 0243 or a temporary data storage area. The storage unit 0244 functions as a temporary storage area and a work memory at the time of an operation of the client computer 0110. A display unit 0249 is, for example, a liquid crystal display connected to the client computer 0110 and receives an input to the client computer 0110 from a user and displays a state of a print job.

Figure 3:
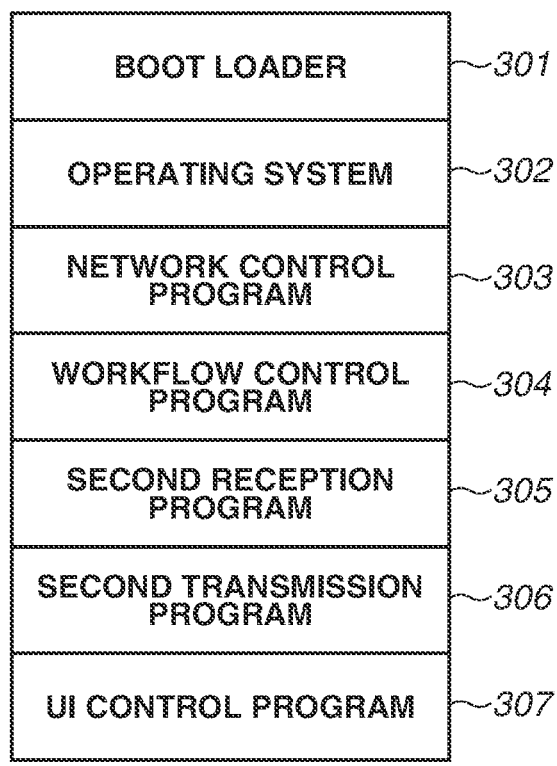
FIG. 3 a block diagram illustrating an example of a configuration of a program included in a client computer.

FIG. 3 illustrates a configuration of programs included in the client computer 0110.

A boot loader 301 is a program executed immediately after power supply to the client computer 0110 is turned on. The program includes a program for executing various starting sequences necessary for starting the system.

An operating system 302 is a program for providing an execution environment for various programs for implementing a function of the client computer 0110. The operating system 302 provides a function of managing resources such as memories of the client computer 0110, i.e., the RAM 0242 and the storage unit 0244, and other functions.

A network control program 303 is a program executed in a case where data is transmitted to and received from devices connected via the network. More specifically, the network control program 303 is used in a case where a print job is transmitted to the image forming apparatus 0101, and print processing is executed. The network control program 303 is also used in a case where a reference image registration instruction file is transmitted to the inspection apparatus 0108. The network control program 303 is further used in a case where a print job transmission instruction is received from the inspection apparatus 0108.

A workflow control program 304 is a program for collectively managing generation of a print job, transmission of the print job, and generation of a file, and is the core of the client computer 0110.

A second reception program 305 is a program for receiving a preparation completion notification from the inspection apparatus 0108. Upon receiving the preparation completion notification from the inspection apparatus 0108, the second reception program 305 notifies the workflow control program 304 of an instruction, a condition, and the like in the preparation completion notification.

A second transmission program 306 is a program for transmitting a file to the inspection apparatus 0108. The second transmission program 306 generates a file using information about the print job before transmitting the print job and transmits the generated file to the inspection apparatus 0108.

A UI control program 307 is a program for controlling a screen to be displayed on the display unit 0249 of the client computer 0110 and controls display on the screen, and enabling and disabling of a button.

FIG. 4 illustrates an example of a print job generated by the client computer 0110. According to the present exemplary embodiment, a description is given based on a Job Definition Format (JDF) format, which is a standard specification, as a print job format. Main pieces of information included in a print job are a job identifier (ID) 401, a print job name 402, resource information 403 for indicating what the PDF data is used for, and a number of copies 404 of the print job. The job ID 401 is used for uniquely identifying the print job.

FIG. 5A illustrates an example of a reference image registration instruction file generated in the client computer 0110 and transmitted to the inspection apparatus 0108. The reference image registration instruction file represents an outline of the print job and is used for a purpose of transmitting the information about the print job to the device such as the inspection apparatus 0108. According to the present exemplary embodiment, the reference image registration instruction file is generated in an Extensible Markup Language (XML) format. However, the reference image registration instruction file may be generated in a JavaScript Object Notation (JSON) format and another different format.

A root element 500 of the reference image registration instruction file corresponds to one print job. A job ID 501 includes a value the same as that of the job ID 401 of the print job in FIG. 4. A reference image identifier 502 is used for a purpose of identifying a reference image by the inspection apparatus 0108. A value of the reference image identifier 502 can be mapped from the print job name 402 and the resource information 403. According to the present exemplary embodiment, the second transmission program 306 maps the value of the print job name 402 in the reference image identifier 502.

A number of copies 503 of the print job indicates how many times the same printing is repeated for one print queue. For example, if the number of pages is ten pages, the number of copies 503 of the print job specifies how many copies (times) to print the entire ten pages. The number of copies 503 of the print job is used for determining how many times inspection is executed in the inspection. If a small value is input to the number of copies 503 of the print job in the reference image registration instruction file, a printed product to be inspected will not be inspected. For this reason, the number of copies 503 of the print job in the reference image registration instruction file is set to the same value as the number of copies specified in the print job.

A number of scans 504 of the printed product is used at the time of the reference image registration. The number of scans 504 of the printed product specifies how many times a non-defective product is scanned in a case where the reference image is generated. According to the present exemplary embodiment, the reference image is obtained by synthesizing images obtained by scanning the non-defective product for a plurality of times. The reference image obtained by synthesizing the images includes less noise, so that inspection accuracy is increased. On the contrary, if the number of scans of the non-defective product is small, noise in the reference image becomes conspicuous, and the inspection accuracy is reduced.

A collate setting 505 indicates presence or absence of a collate setting in the print job. In a case where a plurality of copies is printed with the collate setting, print processing proceeds in an order of a first page, the first page, and the first page, instead of printing of the first page, a second page, and a third page. Thus, the presence or absence of the collate setting is used for determining whether the inspection is also executed in the order of the first page, the first page, and the first page. A media size 506 is a size of a sheet specified in the print job.

FIG. 5B illustrates an example of a reference image registration result file generated in the inspection apparatus 0108 and transmitted to the client computer 0110. The reference image registration result file is used for a purpose of notifying the client computer 0110 of a result of the reference image registration. According to the present exemplary embodiment, the reference image registration result file is generated in the XML, format. However, the reference image registration result file may be generated in the JSON format and the like.

A root element 510 of the reference image registration result file corresponds to one print job. A reference image identifier 511 is used for a purpose of identifying the reference image by the inspection apparatus 0108 and indicates that registration of the reference image identified by the reference image identifier is completed.

FIG. 6 illustrates an example of information stored in a database for associating a printed product, the reference image, and a registration status of the reference image. A database 600 is stored in the storage unit 0244 of the client computer 0110. A reference image identifier 601 is used for a purpose of identifying the reference image by the inspection apparatus 0108. The database 600 includes a job ID 602. The database 600 also includes a reference image registration status 603. In a case where the reference image is registered, the reference image registration status 603 is set to YES. Whereas, in a case where the reference image is not registered, the reference image registration status 603 is set to NO. If the NW I/F 0237 of the client computer 0110 receives the reference image registration result file from the NW I/F 0232 of the inspection apparatus 0108, the second reception program 305 analyzes the reference image registration result file. The second reception program 305 obtains a value from the reference image identifier 511 in the reference image registration result file. The second reception program 305 checks the database 600 and changes the reference image registration status 603 to YES (registered) if the same value as that of the reference image identifier 511 exists in the database 600.

FIGS. 7A, 7B, 7C, and 7D illustrate examples of screens used for executing printing and inspection in the client computer 0110. The screen is controlled by the UI control program 307 and displayed on the display unit 0249. On a screen 700, a print setting button 701, a reference image registration button 702, a print button 703, and a print job list 704 are displayed. The print setting button 701, the reference image registration button 702, and the print button 703 each have an enabled state and a disabled state, accept pressing if they are in the enabled state, and do not accept pressing if they are in the disabled state. A list of the print jobs stored in the storage unit 0244 is displayed in the print job list 704. According to the present exemplary embodiment, a print job is transmitted from a Management Information System as a comma separated value (CSV) file and the like in which a setting value is specified, and is received by the client computer 0110. After the reception, the print job is stored in the storage unit 0244.

FIG. 7A exemplifies a state where a job is not selected in the print job list 704. The print setting button 701, the reference image registration button 702, and the print button 703 are disabled.

FIG. 7B exemplifies a state where a print job of which an inspection setting 711 is set to OFF is selected in the print job list 704. The reference image registration button 702 is disabled, whereas the print setting button 701 and the print button 703 are enabled.

FIG. 7C exemplifies a state where a print job of which the inspection setting 711 is set to ON is selected in the print job list 704, and registration of the reference image corresponding to the selected print job is not completed. The print button 703 is disabled, whereas the print setting button 701 and the reference image registration button 702 are enabled.

FIG. 7D exemplifies a state where a print job of which the inspection setting 711 is set to ON is selected in the print job list 704, and registration of the reference image corresponding to the selected print job is completed. The print setting button 701, the reference image registration button 702, and the print button 703 are enabled.

FIG. 8A illustrates an example of a screen used for executing a print setting in the client computer 0110. The screen is controlled by the UI control program 307 and displayed on the display unit 0249.

FIG. 8A illustrates a print setting screen 705. The print setting screen 705 includes a job ID 706, an entry field 707 for a job name, and an entry field 708 for the number of copies. The print setting screen 705 further includes an entry field 709 for the number of scans necessary for generating one reference image, an entry field 710 for a media size, and a selection field 750 for ON and OFF of the collate setting. A user selects whether to execute the inspection with respect to the print job using a selection field 712. In a case where the selection field 712 for the inspection is set to ON, the inspection is executed if the user performs a reference image registration operation and then performs a print operation. In a case where the selection field 712 for inspection is set to OFF, if the user performs the print operation, only printing is executed, and the inspection is not executed. The print setting screen 705 further includes a print setting completion button 713.

FIG. 8B illustrates an example of an inspection parameter setting screen in the inspection apparatus 0108. The inspection parameter setting screen is displayed on the display unit 0245 of the inspection apparatus 0108.

An inspection parameter setting screen 714 includes a job name 715 of an inspection target currently being set and an entry field 716 for the number of copies subjected to the inspection. The inspection parameter setting screen 714 further includes an entry field 717 for a media size (sheet size) of the inspection target, a selection field 718 for ON and OFF of the collate setting, and a setting button 719 for an inspection area and an inspection level. If the setting button 719 is pressed, an inspection area setting screen (not illustrated) is opened and receives specification of an area to be inspected in the reference image and a setting of an inspection level corresponding to the area from a user. The inspection parameter setting screen 714 further includes an inspection parameter setting completion button 720.

Processing according to the present exemplary embodiment is described with reference to flowcharts. A program of the image forming apparatus 0101 according to the present flowchart is stored in the storage unit 0205 of the image forming apparatus 0101, read into the RAM 0202, and executed by the CPU 0201. A program of the inspection apparatus 0108 according to the present flowchart is stored in the storage unit 0228 of the inspection apparatus 0108, read into the RAM 0227, and executed by the CPU 0226. A program of the information processing apparatus 0109 according to the present flowchart is stored in the storage unit 0236 of the information processing apparatus 0109, read into the RAM 0235, and executed by the CPU 0234. A program of the client computer 0110 according to the present flowchart is stored in the storage unit 0244 of the client computer 0110, read into the RAM 0242, and executed by the CPU 0243.

Figure 11:
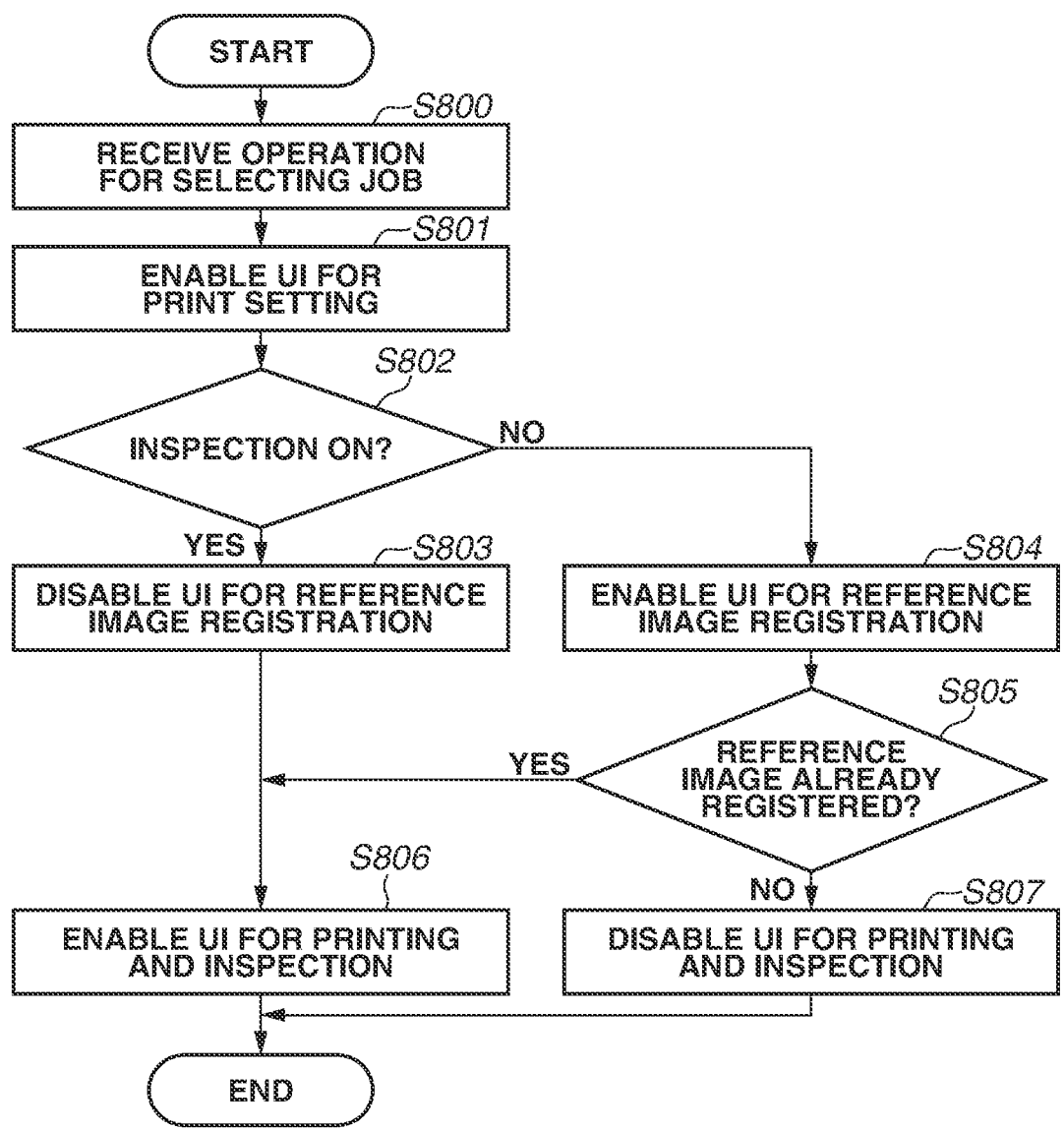
FIG. 11 is a flowchart illustrating processing to be executed in a case where a selection of a print job is instructed, according to the first exemplary embodiment.

FIG. 11 illustrates processing executed by the client computer 0110 in a case where the client computer 0110 is instructed to select the print job. More specifically, the UI control program 307 receives an operation and executes various processing for controlling the UI.

In step S800, the UI control program 307 receives an operation for selecting the print job. Each line in the print job list 704 on the screen 700 illustrated in FIG. 7A indicates a print job, and if a user selects the line, the UI control program 307 receives a selection of the print job corresponding to the line.

In step S801, the UI control program 307 enables a UI for executing the print setting. The UI for executing the print setting is, for example, the print setting button 701 illustrated in FIG. 7A. The print setting button 701 is disabled before selection of the print job and does not accept pressing. In a case where a print job is selected as illustrated in FIGS. 7B, 7C, and 7D, the print setting button 701 receives pressing, and the UI control program 307 displays the print setting screen 705 illustrated in FIG. 8B.

In step S802, the workflow control program 304 determines whether the inspection is set to ON or OFF in the print setting of the selected print job. As a result of the determination, in a case where the inspection is set to ON (YES in step S802), the processing proceeds to step S804. On the other hand, in a case where the inspection is set to OFF (NO in step S802), the processing proceeds to step S803.

In step S803, the UI control program 307 disables a UI for executing the reference image registration. The UI for executing the reference image registration is, for example, the reference image registration button 702 illustrated in FIG. 7A. The reference image registration button 702 in FIG. 7B indicates the disabled state and does not accept pressing. According to the present exemplary embodiment, the reference image registration is executed by pressing the reference image registration button 702. However, the reference image registration may be executed by pressing, for example, a test print button. In this case, the test print button may be enabled.

In step S804, the UI control program 307 enables the UI for executing the reference image registration. The reference image registration buttons 702 in FIGS. 7C and 7D indicate the enabled state and accept pressing.

In step S805, the workflow control program 304 determines whether the reference image of the selected print job is already registered. The workflow control program 304 refers to the database 600 illustrated in FIG. 6 and determines whether the reference image registration status 603 corresponding to the reference image identifier 502 associated with the print job is registered. In a case where it is determined that the reference image is already registered (YES in step S805), the processing proceeds to step S806. Whereas, in a case where it is determined that the reference image is not registered (NO in step S805), the processing proceeds to step S807.

In step S806, the UI control program 307 enables a UI for executing printing and inspection. The UI for executing printing and inspection is, for example, the print button 703 illustrated in FIG. 7A. The print buttons 703 in FIGS. 7B and 7D indicate the enabled state and accept pressing.

In step S807, the UI control program 307 disables the UI for executing printing and inspection. The print buttons 703 in FIGS. 7A and 7C indicate the disabled state and do not accept pressing.

Figure 12:
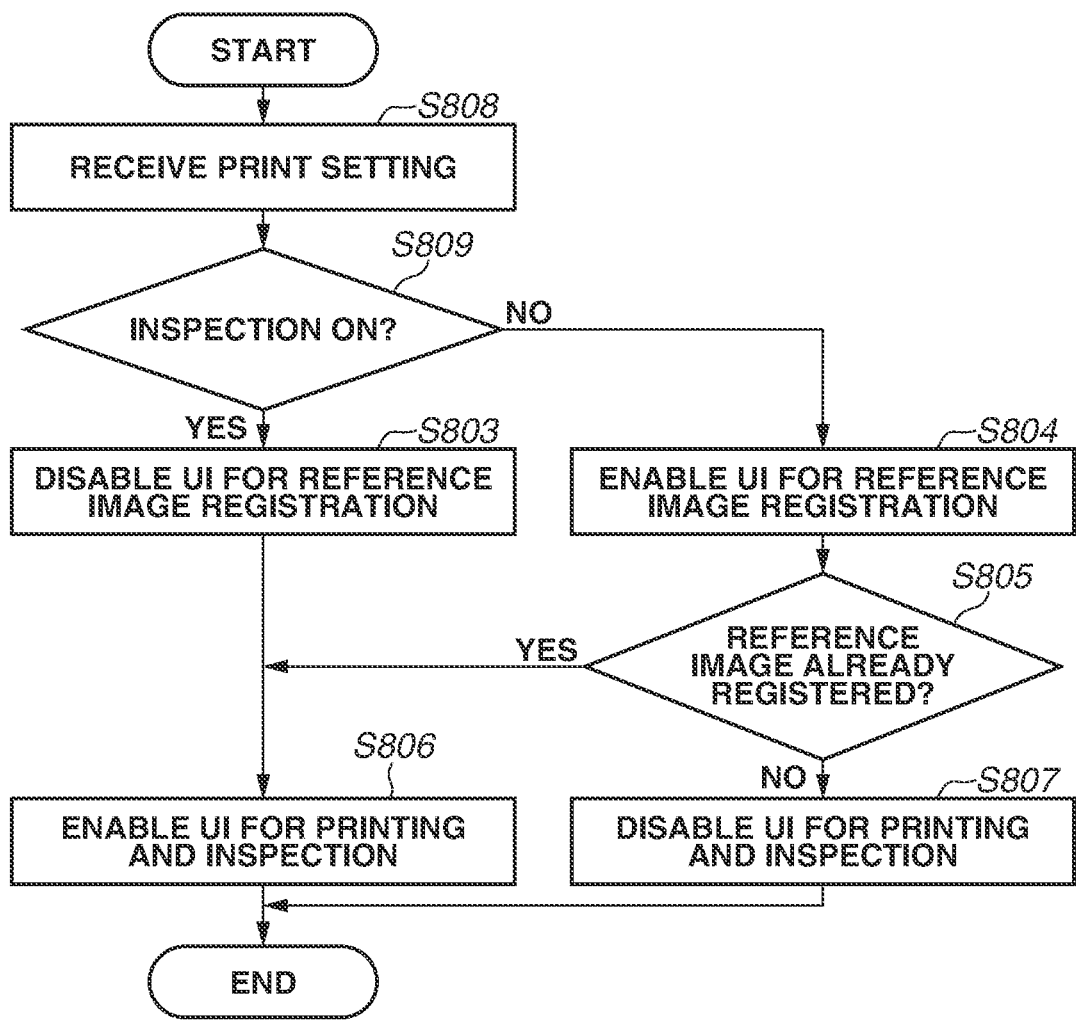
FIG. 12 is a flowchart illustrating processing to be executed in a case where a completion of a print setting is instructed, according to the first exemplary embodiment.

FIG. 12 illustrates processing executed by the client computer 0110 in a case where the client computer 0110 is instructed to complete the print setting. More specifically, the UI control program 307 receives an operation and executes various processing for controlling the UI.

In step S808, the workflow control program 304 receives the print setting. The print setting is performed on the print setting screen displayed by the UI control program 307 if a user selects the print job and presses the print setting button 701, and the print setting is received by pressing the print setting completion button 713.

In step S809, the workflow control program 304 analyzes the received print setting and determines whether the inspection is set to ON or OFF in the print setting of the print job.

As a result of the determination, in a case where the inspection is set to ON (YES in step S809), the processing proceeds to step S804. Whereas, in a case where the inspection is set to OFF (NO in step S809), the processing proceeds to step S803.

The processing in steps S803 and S804 and subsequent steps is already described with reference to FIG. 8A, and thus the descriptions thereof are omitted.

Figure 13:
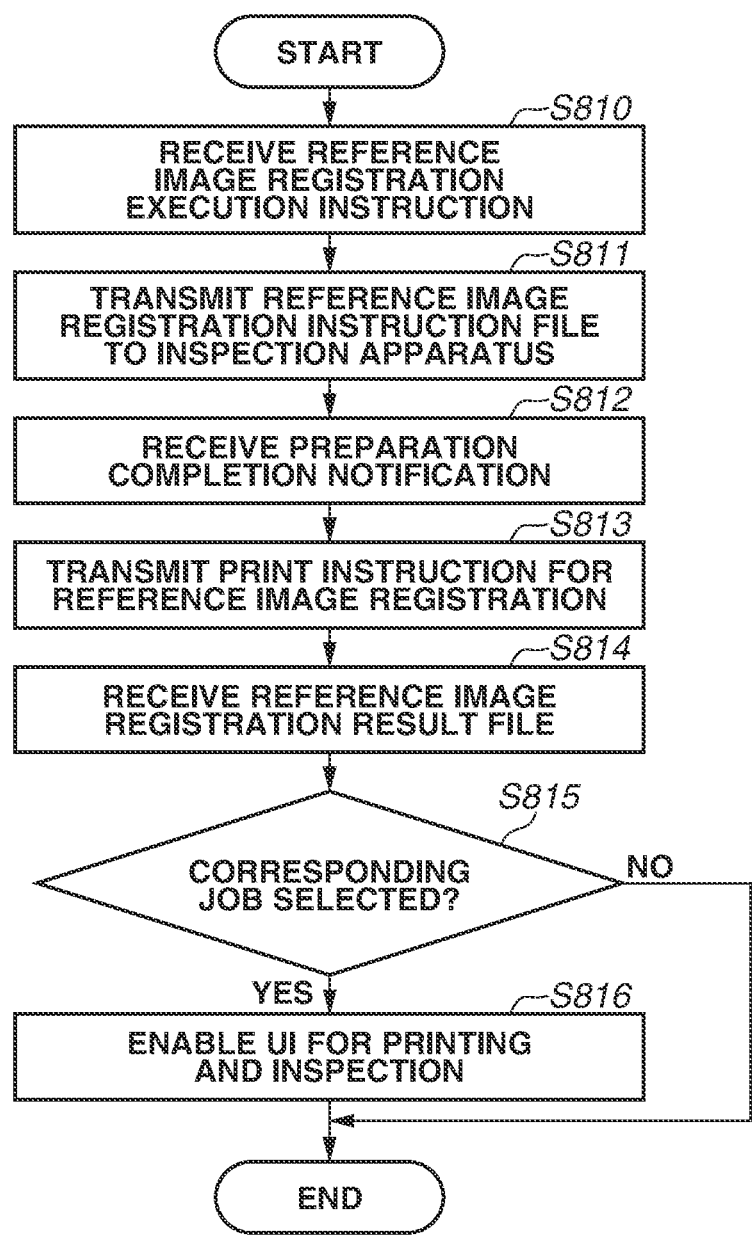
FIG. 13 is a flowchart illustrating processing to be executed in a case where an execution of reference image registration is instructed, according to the first exemplary embodiment.

FIG. 13 is a flowchart illustrating processing at the time of the reference image registration by the client computer 0110.

In step S810, the workflow control program 304 receives a reference image registration execution instruction. The reference image registration execution instruction corresponds to, for example, pressing of the reference image registration button 702 by a user.

In step S811, the second transmission program 306 generates the reference image registration instruction file illustrated in FIG. 5A based on the setting of the print job and transmits the reference image registration instruction file to the inspection apparatus 0108. A transmission method may be Hypertext Transfer Protocol (HTTP) communication or to store the reference image registration instruction file in a folder accessible by the client computer 0110 and the inspection apparatus 0108. According to the present exemplary embodiment, the method for storing the reference image registration instruction file in the folder is described.

In step S812, the second reception program 305 obtains a deletion event of the reference image registration instruction file stored in the folder and thus determines that a print instruction corresponding to the reference image registration instruction file can be transmitted.

In step S813, the workflow control program 304 transmits a print instruction for the reference image registration to the image forming apparatus 0101 via the information processing apparatus 0109.

In step S814, if the reference image registration result file is received from the NW I/F 0232 of the inspection apparatus 0108, the second reception program 305 analyzes the reference image registration result file and obtains a value from the reference image identifier 511 in the reference image registration result file. The second reception program 305 checks the database 600 and changes the reference image registration status 603 to YES (registered) if the same value as that of the reference image identifier 511 exists in the database 600.

In step S815, the UI control program 307 obtains the job ID corresponding to the reference image identifier 511 of which the reference image registration status 603 is changed to YES (registered) from the database 600 and determines whether the obtained job ID matches the job ID of the print job selected in the print job list. As a result of the determination, in a case where the job ID is selected (YES in step S815), the processing proceeds to step S816. Whereas, in a case where the job ID is not selected (NO in step S815), the reference image registration processing by the client computer 0110 is terminated.

In step S816, the UI control program 307 enables the UI for executing printing and inspection. The UI for executing printing and inspection is, for example, the print button 703 illustrated in FIG. 7A. The print buttons 703 in FIGS. 7B and 7D indicate the enabled state and accept pressing.

Figure 14:
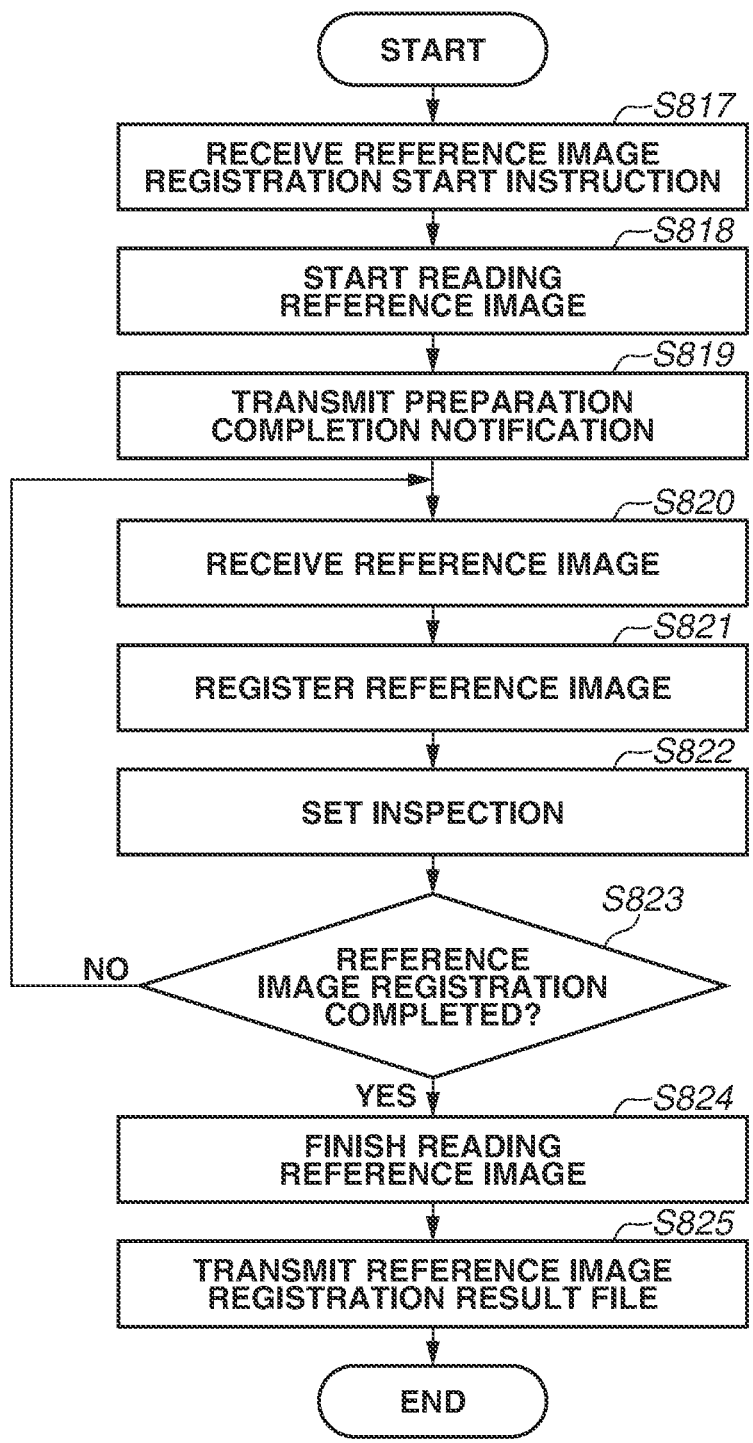
FIG. 14 is a flowchart illustrating processing to be executed in a case where start of reference image registration is instructed, according to the first exemplary embodiment.

FIG. 14 is a flowchart illustrating processing at the time of the reference image registration by the inspection apparatus 0108.

In step S817, the CPU 0226 receives a reference image registration start instruction from the client computer 0110.

According to the present exemplary embodiment, the CPU 0226 receives the reference image registration start instruction by reading the reference image registration instruction file stored in the folder by the client computer 0110.

In step S818, the CPU 0226 starts reading the reference image. At that time, the inspection unit I/F 0231 notifies the inspection apparatus I/F 0215 of the start of reading the reference image. Then, the CPU 0216 notifies the image capturing unit 0218 to prepare for reading the reference image. If the preparation is completed, the CPU 0216 notifies the CPU 0226 of the completion via the inspection apparatus I/F 0215 and the inspection unit I/F 0231.

In step S819, since the preparation for the reference image registration is completed, the CPU 0226 is in a state of waiting for receiving a scanned image of the printed product. Further, the CPU 0226 notifies the client computer 0110 that the preparation for starting the reference image registration is completed. According to the present exemplary embodiment, the completion of the preparation for starting the reference image registration is notified by deleting the reference image registration instruction file stored in the folder.

In step S820, the CPU 0226 receives an image of the printed product scanned by the inspection unit 0106 from the inspection unit 0106 via the inspection apparatus I/F 0215 and the inspection unit I/F 0231.

In step S821, the CPU 0226 registers the image received in step S820 in the RAM 0227 as the reference image. At that time, a plurality of reference images can be read to allow a user to select one from them, combine them, or register a plurality of the reference images.

In step S822, the CPU 0226 displays the inspection parameter setting screen 714 on the display unit 0245. If the display unit 0245 receives a "completion" instruction on the inspection parameter setting screen 714, the processing proceeds to step S823.

In step S823, the CPU 0226 determines whether the reference image registration is completed for the number of sheets of the print job described in an inspection start instruction file. In a case where the reference image registration is completed (YES in step S823), the processing proceeds to step S824. Whereas, in a case where the reference image registration is not completed (NO in step S823), the processing returns to step S820.

In step S824, the reference image registration is completed for the number of sheets of the print job described in the inspection start instruction file, and thus the CPU 0226 finishes reading the reference image.

In step S825, the CPU 0226 transmits the reference image registration result file to the client computer 0110.

Figure 15:
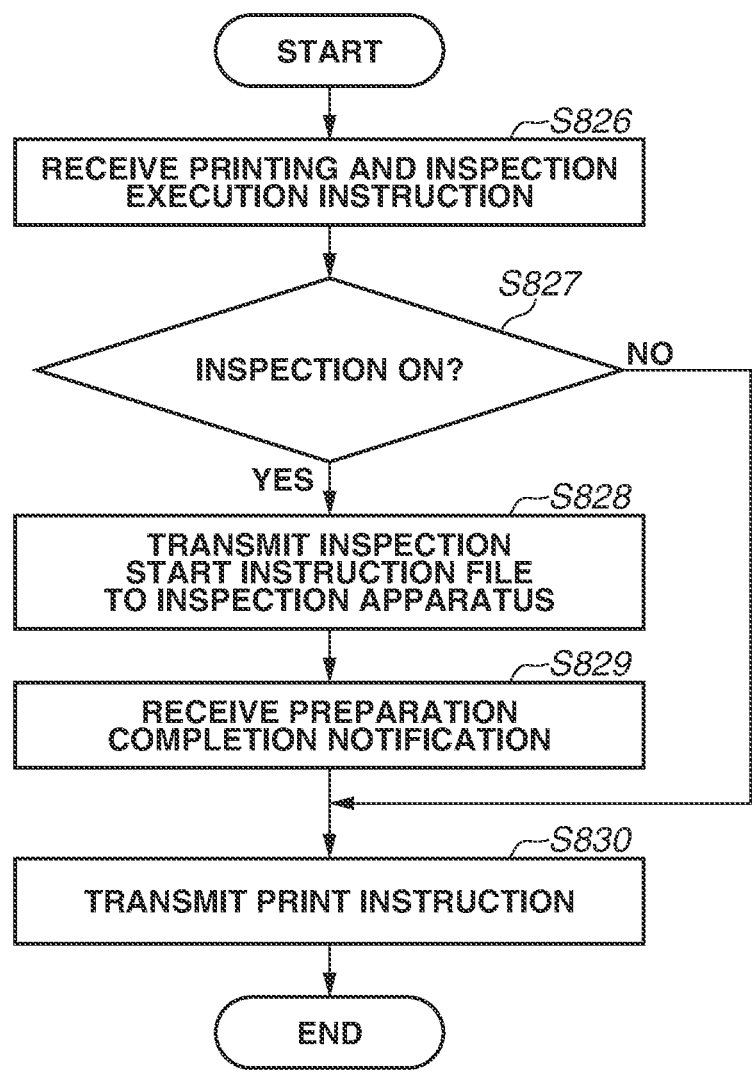
FIG. 15 is a flowchart illustrating processing to be executed in a case where an execution of printing and an inspection is instructed, according to the first exemplary embodiment.

FIG. 15 is a flowchart illustrating processing at the time of executing printing and inspection by the client computer 0110.

In step S826, the workflow control program 304 receives a printing and inspection execution instruction. The printing and inspection execution instruction corresponds to, for example, a pressing operation on the print button 703 by a user.

In step S827, the workflow control program 304 determines whether the inspection setting is set to ON in the print job to which the printing and inspection execution instruction is issued. As a result of the determination, in a case where the inspection is set to ON (YES in step S827), the processing proceeds to step S828. Whereas, in a case where the inspection is set to OFF (NO in step S827), the processing proceeds to step S830.

In step S828, the second transmission program 306 generates an inspection start instruction file based on the setting in the print job and transmits the generated inspection start instruction file to the inspection apparatus 0108. The transmission method may be the HTTP communication or to store the inspection start instruction file in the folder accessible by the client computer 0110 and the inspection apparatus 0108. According to the present exemplary embodiment, the method for storing the inspection start instruction file in the folder is described.

In step S829, the second reception program 305 obtains a deletion event of the inspection start instruction file stored in the folder and thus determines that a print instruction corresponding to the inspection start instruction file can be transmitted.

In step S830, the workflow control program 304 transmits the print instruction to the image forming apparatus 0101 via the information processing apparatus 0109.

Figure 16:
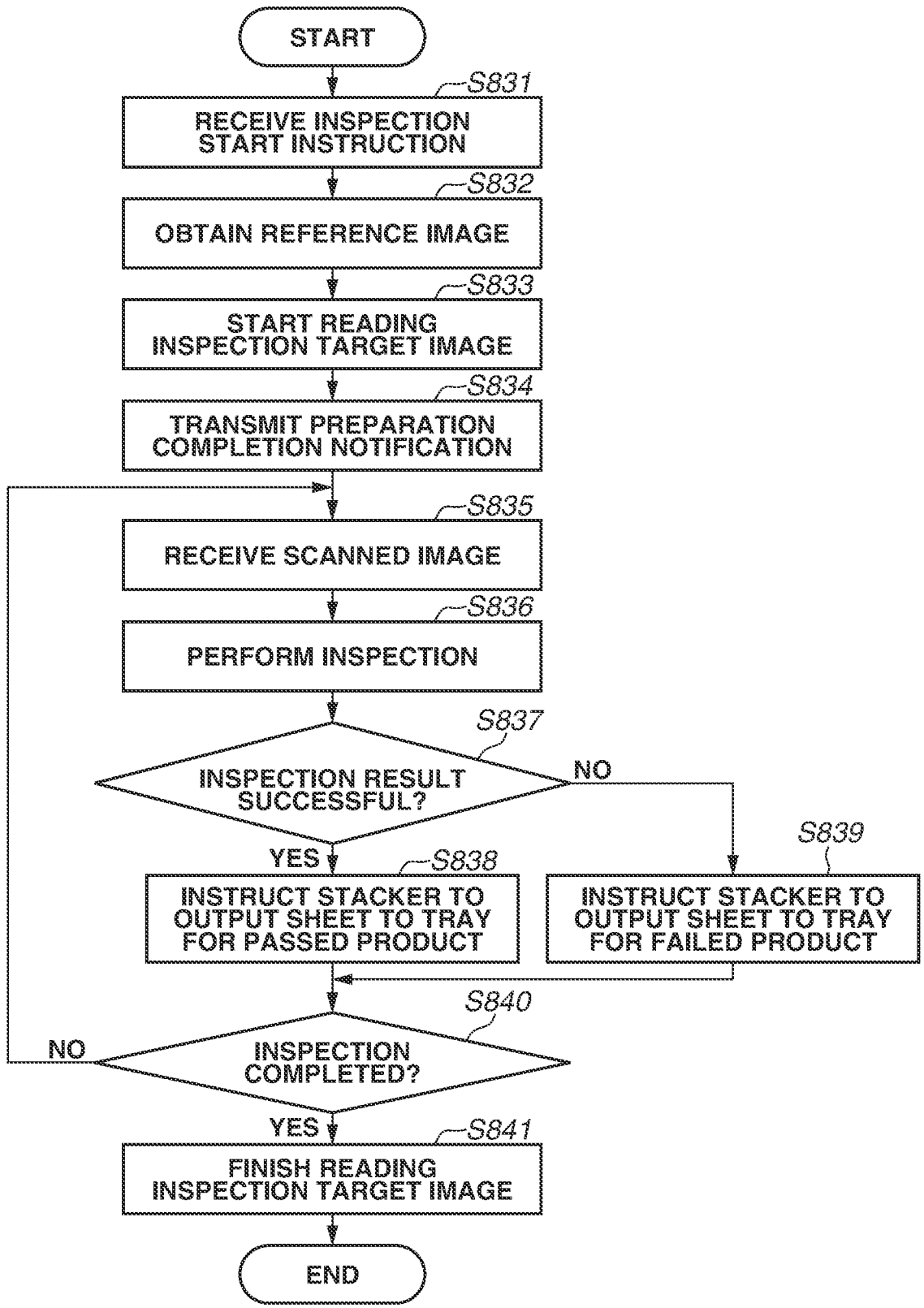
FIG. 16 is a flowchart illustrating processing to be executed in a case where a start of inspection is instructed, according to the first exemplary embodiment.

FIG. 16 is a flowchart illustrating processing at the time of executing inspection by the inspection apparatus 0108.

In step S831, the CPU 0226 receives an inspection start instruction from the client computer 0110. According to the present exemplary embodiment, the CPU 0226 receives the inspection start instruction by reading the inspection start instruction file stored in the folder by the client computer 0110.

In step S832, the CPU 0226 obtains the reference image corresponding to the print job using information described in the inspection start instruction.

In step S833, the CPU 0226 starts inspection of the print job for which the association with the reference image is completed and starts reading an inspection target image.

In step S834, since the preparation for the reference image registration is completed, the CPU 0226 is in a state of waiting for scanning the printed product. Further, the CPU 0226 notifies the client computer 0110 that the preparation for starting the inspection is completed. According to the present exemplary embodiment, the completion of the preparation for starting the inspection is notified by deleting the inspection start instruction file stored in the folder.

In step S835, the CPU 0226 receives an image to be inspected scanned by the inspection unit 0106 from the inspection unit 0106 via the inspection apparatus I/F 0215 and the inspection unit I/F 0231.

In step S836, the CPU 0226 reads the reference image identified in step S832 from the storage unit 0228 and performs inspection by comparing the reference image with the image to be inspected received from the inspection unit 0106.

In step S837, the CPU 0226 determines an inspection result. In a case where the inspection result is successful (YES in step S837), the processing proceeds to step S838. Whereas, in a case where the inspection result is failure (NO in step S837), the processing proceeds to step S839.

In step S838, the CPU 0226 instructs the large capacity stacker 0107 to output the printed product having passed the inspection to the main tray in the sheet discharge unit 0223 of the large capacity stacker 0107.

In step S839, the CPU 0226 instructs the large capacity stacker 0107 to output the printed product having failed the inspection to the top tray in the sheet discharge unit 0223 of the large capacity stacker 0107.

In step S840, the CPU 0226 determines whether the inspection is completed for the inspection target printed product. In a case where the inspection is completed (YES in step S840), the processing proceeds to step S841. Whereas, in a case where the inspection is not completed (NO in step S840), the processing returns to step S835.

In step S841, since the inspection is completed for the inspection target printed product, the CPU 0226 finishes reading the inspection target image.

According to the above-described exemplary embodiment, the example in which it is determined whether the reference image is registered to change the display of the UI, and if the reference image is registered, a print instruction can be issued, is described. However, it may be determined whether the reference image is registered after issuing the print instruction, and if the reference image is registered, the print job may be transmitted, whereas, if the reference image is not registered, the print job may not be transmitted.

In FIGS. 7A to 7D, the print button 703 is controlled to be selectable in a case where the reference image is registered. According to a modification of the first exemplary embodiment, the print button 703 can be selected regardless of whether the reference image is registered.

FIG. 20 is a flowchart illustrating processing according to the modification of the first exemplary embodiment. More specifically, FIG. 20 is the flowchart illustrating the processing at the time of executing printing and inspection by the client computer 0110. Steps are similar to those in FIG. 15 except for steps S848 and S849, and thus the descriptions thereof are omitted.

In step S848, the workflow control program 304 determines whether the reference image of the print job that is instructed to be printed in step S826 is already registered. A determination method is similar to that in step S805 in FIG. 11. In a case where it is determined that the reference image is already registered (YES in step S848), the processing proceeds to step S827. Whereas, in a case where it is determined that the reference image is not registered (NO in step S848), the processing proceeds to step S849.

In step S849, a warning is displayed for indicating that the reference image is not registered.

According to the present exemplary embodiment, in a case where the reference image corresponding to the printed product is not registered, the printed product can be prevented from being output in a state where the inspection cannot be executed.

According to the first exemplary embodiment, the configuration in which information necessary for the inspection apparatus to execute inspection is described in the inspection start instruction file and transmitted by the client computer, is described. On the other hand, the information necessary for the inspection apparatus to execute the inspection may be input by the inspection apparatus in some cases. The information necessary for the inspection apparatus to execute inspection differs depending on the inspection apparatus. According to a second exemplary embodiment, the inspection apparatus determines whether input of the information necessary for executing the inspection is completed, and if not, the client computer prevents a user from executing an operation for executing printing and inspection. Accordingly, the printed product can be prevented from being output in a state where the inspection cannot be executed.

According to the second exemplary embodiment, an example in which it is determined that the reference image is registered in a case where the information necessary for executing the inspection is prepared in addition to the reference image is described with reference to FIGS. 9 and 17. Parts common to the above-described exemplary embodiment are omitted from the description below.

FIG. 9 illustrates a database for determining whether input of the information necessary for the inspection apparatus to execute the inspection is completed. A database 900 is stored in the storage unit 0228 of the inspection apparatus 0108.

A column 901 indicates whether a user needs to set each inspection parameter on the inspection parameter setting screen 714. "TRUE" represents that a setting of the corresponding inspection parameter is required, and "FALSE" represents that the setting of the corresponding inspection parameter is not required. "TRUE" is stored in the column 901 for the inspection parameter which must be set in step S822. For example, in a case where the column 901 of the media size is set to "TRUE", the inspection parameter setting screen 714 is not closed even if a user presses the inspection parameter setting completion button 720 unless the user inputs the media size in the entry field 717 on the inspection parameter setting screen 714. On the other hand, "FALSE" is stored in the column 901 in a case where a default value is prepared and the inspection can be executed without setting the parameter and in a case where the parameter is obtained later by receiving a setting value in the inspection start instruction in step S831. For example, in a case where the inspection can be executed using default inspection area and inspection level even if a user does not set the inspection area and the inspection level, "FALSE" is stored in the columns 901 corresponding to the inspection area and the inspection level.

Figure 17:
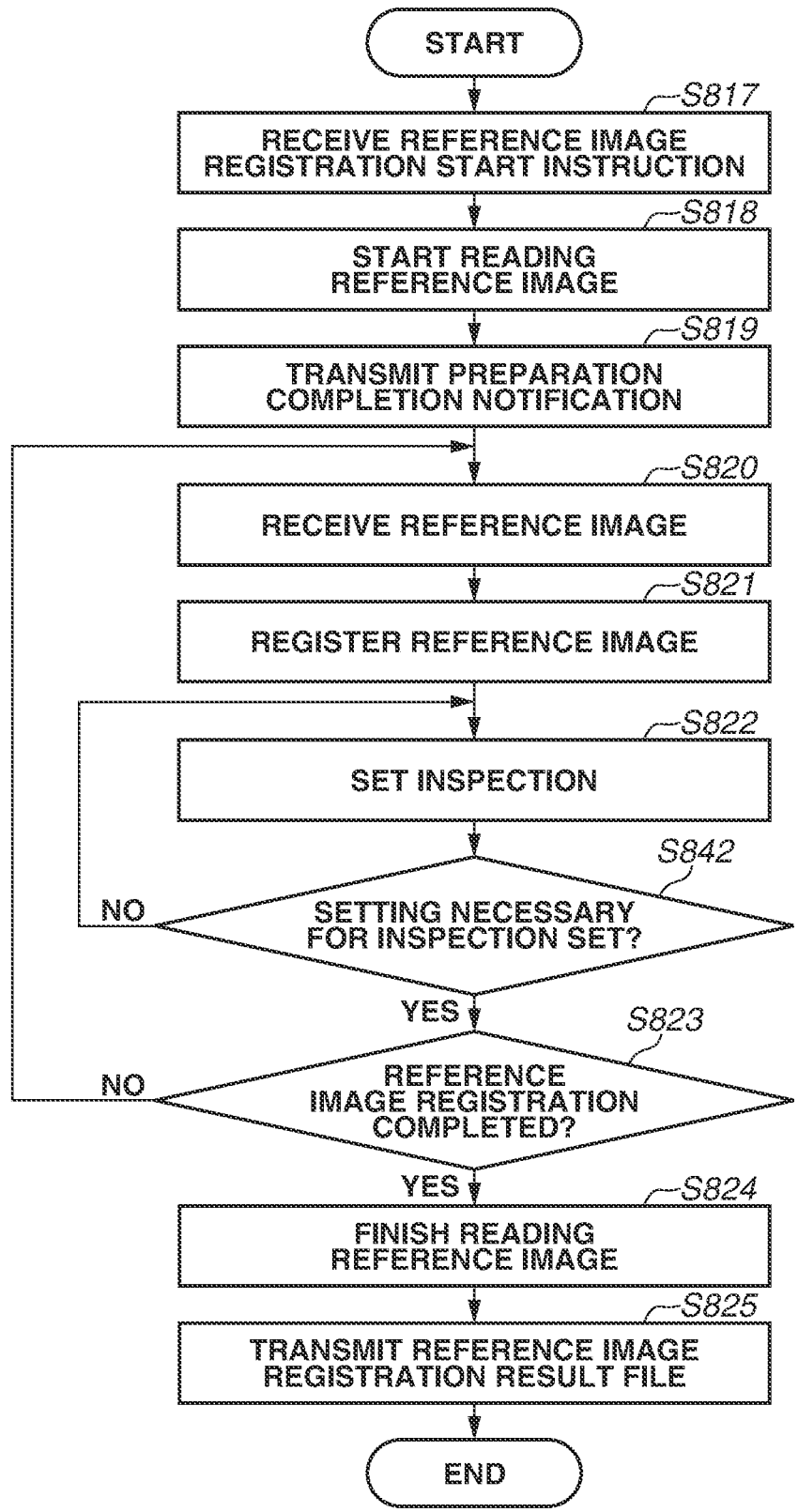
FIG. 17 is a flowchart illustrating processing to be executed in a case where start of reference image registration is instructed according to the second exemplary embodiment.

FIG. 17 illustrates processing executed by the inspection apparatus 0108 in a case where the inspection apparatus 0108 is instructed to start the reference image registration. More specifically, the CPU 0226 receives the instruction and executes various processing for registering the reference image.

In step S842, the CPU 0226 checks the inspection parameter set in step S822 and determines whether input of a parameter necessary for executing the inspection is completed. As a result of the determination, in a case where the input is completed (YES in step S842), the processing proceeds to step S823. Whereas, in a case where the input is not completed (NO in step S842), the processing proceeds to step S822. The parameter necessary for executing the inspection includes the number of copies of inspection, the inspection area, and the inspection level. The database 900 illustrated in FIG. 9 is used for determining whether the input is completed. The database 900 is stored in the storage unit 0228 of the inspection apparatus 0108. The CPU 0226 determines whether the settings are all completed by comparing the parameter specified as "TRUE" in the inspection setting registered in the database 900 with the inspection parameter set in step S822.

According to the present exemplary embodiment, even in the configuration in which the information necessary for the inspection apparatus to execute the inspection is input by the inspection apparatus, the printed product can be prevented from being output in a state where the inspection cannot be executed.

There is a case where information necessary for inspection, such as feature point information, is obtained from an image scanned for the reference image registration.

Figure 10:
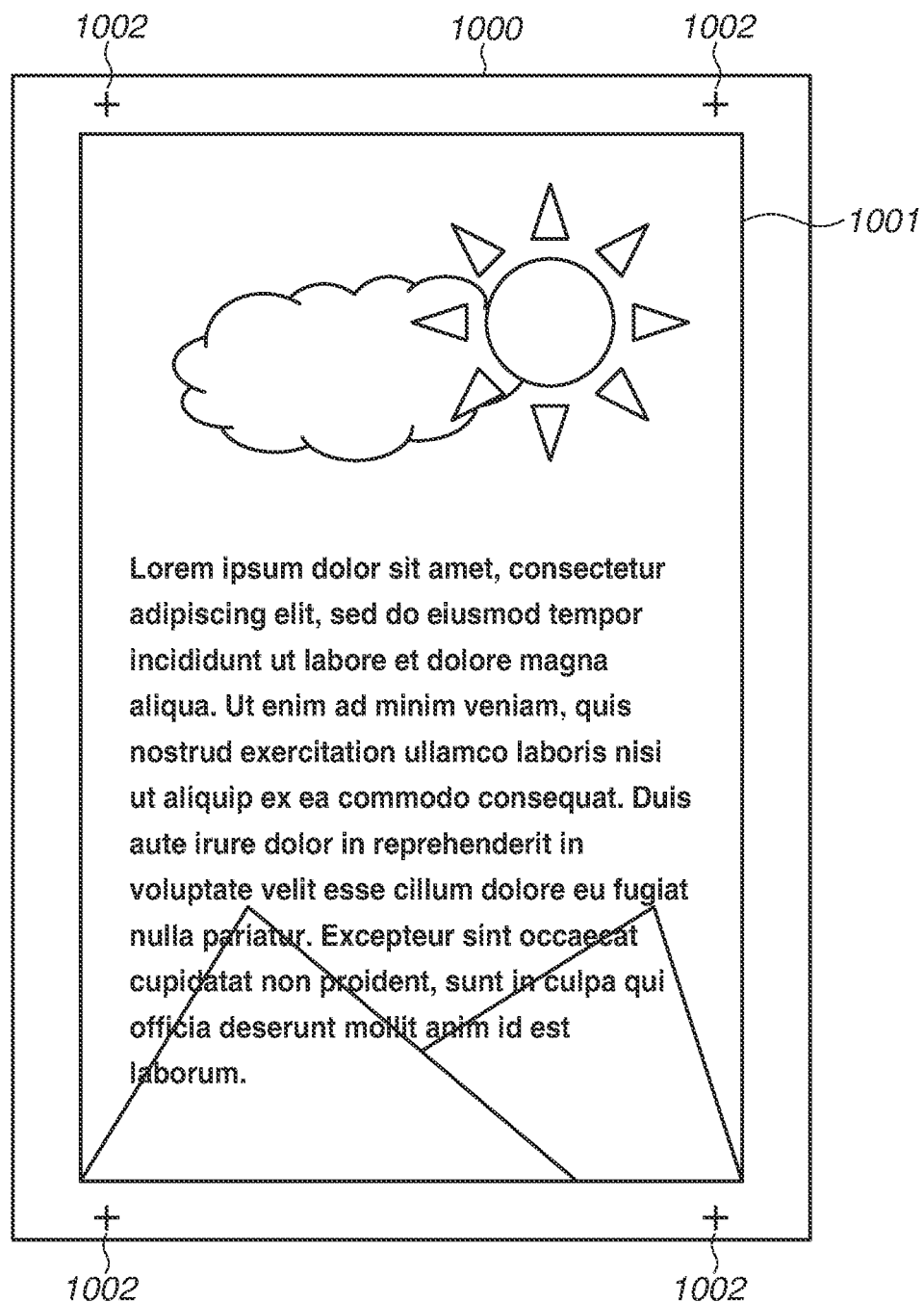
FIG. 10 illustrates an example of a reference image according to a third exemplary embodiment.

In the inspection processing, it is necessary to adjust the position of an image in the reference image and an image of the printed product included in the image to be inspected to compare the reference image with the image to be inspected. FIG. 10 illustrates an example of the scanned image. The position adjustment may be performed in two ways, i.e., a case in which an outline 1000 of a sheet in a scanned image is used as a feature point and a case in which an image 1001 printed on the sheet is used as the feature point. In a case where the sheet does not fit within a range in which a scanner can capture an image, the outline 1000 of the sheet in the scanned image cannot be detected to use as the feature point. Further, in a case where the image 1001 printed on the sheet has less feature, such as a blank page, the feature point cannot be detected from the image 1001 printed on the sheet. In the above-described cases, a user needs to add a marker 1002 and the like for detecting the feature point to the image to enable the feature point to be detected and then to register the reference image again. According to a third exemplary embodiment, the inspection apparatus determines whether the information necessary for executing the inspection can be obtained from the scanned image, and if not, the client computer prevents a user from executing an operation for executing printing and inspection. Accordingly, the printed product can be prevented from being output in a state where the inspection cannot be executed.

According to the third exemplary embodiment, an example in which the information necessary for the inspection cannot be obtained from an image scanned for the reference image registration is described with reference to FIG. 18. Parts common to the above-described exemplary embodiments are omitted from the description below. The processing added to the present exemplary embodiment may be added to the processing according to the second exemplary embodiment and executed.

Figure 18:
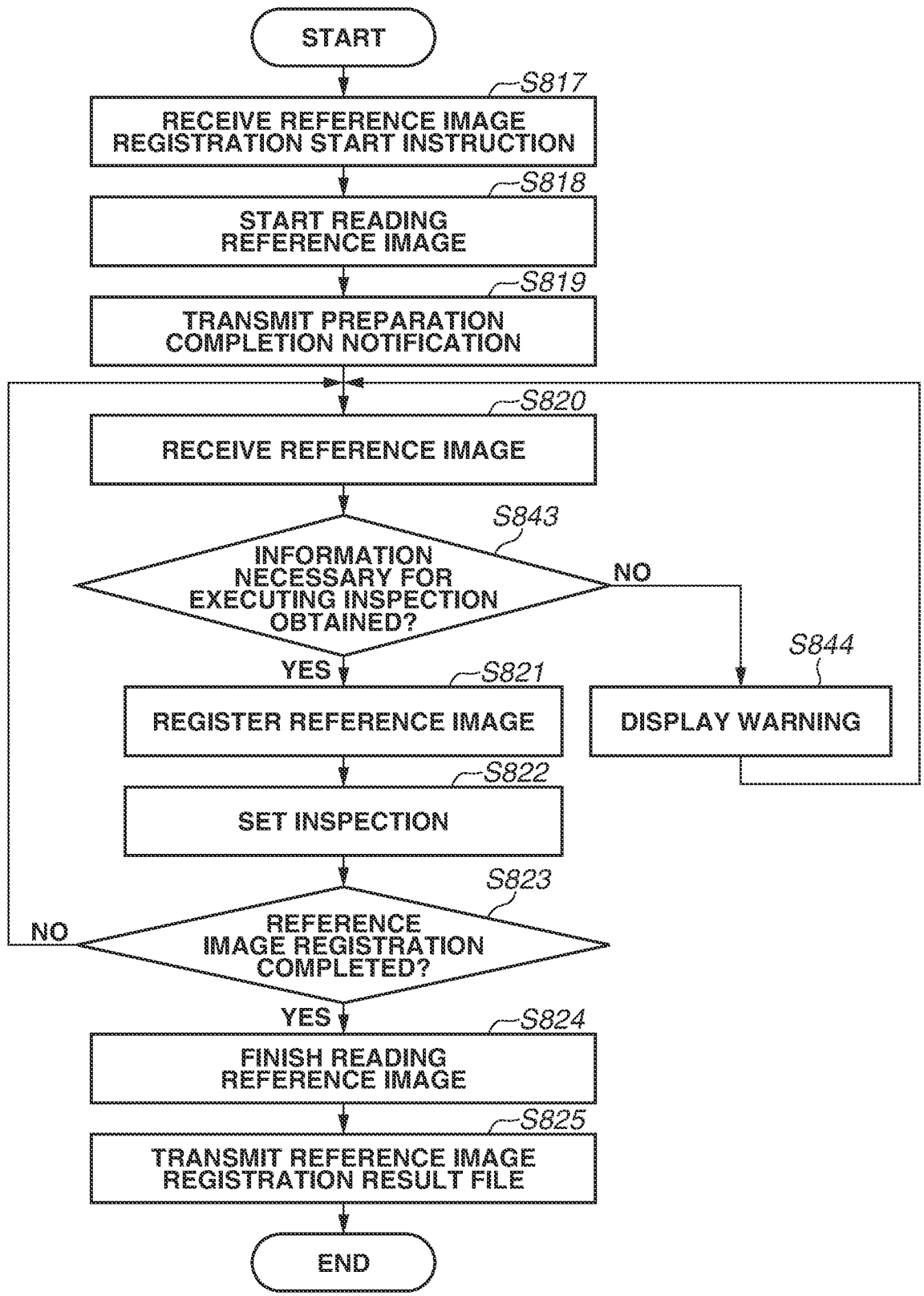
FIG. 18 is a flowchart illustrating processing to be executed in a case where a start of reference image registration is instructed, according to the third exemplary embodiment.

FIG. 18 illustrates processing executed by the inspection apparatus 0108 in a case where the inspection apparatus 0108 is instructed to start the reference image registration. More specifically, the CPU 0226 receives the instruction and executes various processing for registering the reference image.

In step S843, the CPU 0226 determines whether the information necessary for executing the inspection can be obtained. According to the present exemplary embodiment, the CPU 0226 determines whether the feature point can be detected from the scanned image. As a result of the determination, in a case where the information necessary for executing the inspection can be obtained (YES in step S843), the processing proceeds to step S821. Whereas, in a case where the information necessary for executing the inspection cannot be obtained (NO in step S843), the processing proceeds to step S844.

In step S844, the CPU 0226 displays, on the display unit 0245, that the information necessary for executing the inspection cannot be obtained from the scanned image to notify a user thereof.

According to the present exemplary embodiment, in the configuration in which the inspection apparatus obtains the information necessary for executing inspection from the scanned image, the printed product can be prevented from being output while the inspection cannot be executed in a case where the information cannot be obtained.

In a case of a system of generating one reference image from a plurality of scanned images, it is necessary to perform synthesis processing and then start inspection. On the other hand, if there is one scanned image, the inspection can be started without performing the synthesis processing. Whether to execute the synthesis processing is specified for each print job on the print setting screen 705 in the client computer 0110. In a case where a value more than one is set in the entry field 709 for the number of scans, the synthesis processing is executed, whereas in a case where 1 is set in the entry field 709 for the number of scans, the synthesis processing is not executed.

According to a fourth exemplary embodiment, an example in which a reference image is generated by synthesizing a plurality of the scanned images is described with reference to FIG. 19. Parts common to the above-described exemplary embodiments are omitted from the below description. Processing added to the present exemplary embodiment may be added to the processing according to the second and the third exemplary embodiments and executed.

Figure 19:
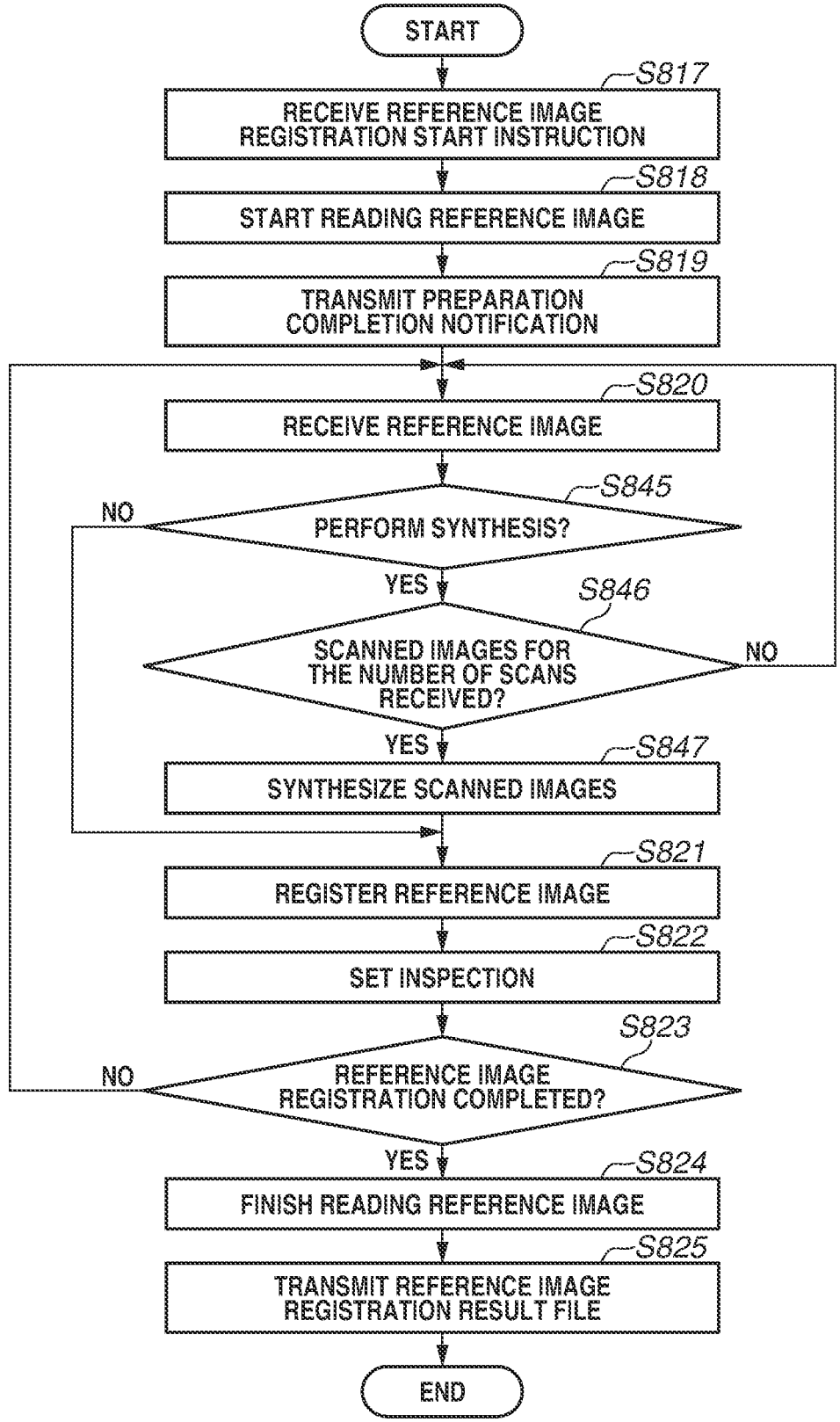
FIG. 19 is a flowchart illustrating processing to be executed in a case where a start of reference image registration is instructed, according to a fourth exemplary embodiment.

FIG. 19 illustrates processing executed by the inspection apparatus 0108 in a case where the inspection apparatus 0108 is instructed to start the reference image registration. More specifically, the CPU 0226 receives the instruction and executes various processing for registering the reference image.

In step S845, the CPU 0226 determines whether it is necessary to perform the synthesis processing on the scanned images. The CPU 0226 refers to the number of scans of the printed product specified in the reference image registration instruction file received in step S817. In a case where the value is more than one, the CPU 0226 determines that it is necessary to perform the synthesis processing on the scanned image (YES in step S845), and the processing proceeds to step S846. In the case where the value is one, the CPU 0226 determines that it is not necessary to perform the synthesis processing on the scanned images (NO in step S845), and the processing proceeds to step S821. In step S846, the CPU 0226 determines whether the scanned images for the specified number of scans of the printed product are received. In a case where the scanned images for the specified number of scans of the printed product are received (YES in step S846), the processing proceeds to step S847. Whereas, in a case where the scanned images for the specified number of scans of the printed product are not received (NO in step S846), the processing proceeds to step S820. In step S847, the CPU 0226 synthesizes a plurality of the scanned images and generates one reference image.

According to the present exemplary embodiment, in a case where the synthesis processing does not have to be performed, a user can execute the inspection even if the synthesis processing is not performed.

According to the first exemplary embodiment, a printing and inspection start instruction is prevented from being executed by disabling the print button 703 of the print job for which the corresponding reference image is not registered. However, instead of disabling the print button 703, it may be determined whether the corresponding reference image is registered when the print button 703 is pressed, and if the reference image is not registered, a user may be notified of that effect. In this case, if the print button is pressed, the inspection apparatus may be inquired as to whether the reference image is already registered.

According to the above-described exemplary embodiments, a printed product can be prevented from being output in a state where inspection cannot be correctly executed since a reference image corresponding to the printed product is not registered.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus configured to communicate with a printing apparatus and an inspection apparatus, the inspection apparatus being configured to inspect quality of a printed product obtained by performing printing by the printing apparatus, the information processing apparatus comprising:
a display configured to perform display on a screen; and
one or more controllers having one or more processors and one or more memories, the one or more controllers being configured to:
perform job control of,
based on a user operation on a first button displayed by the display, transmitting a registration job for registering a reference image into the inspection apparatus, the reference image being an image to be used for inspecting the quality of the printed product, and
based on a user operation on a second button displayed by the display, transmitting a print job to the printing apparatus,
wherein, in the job control, control is performed such that the print job is not transmitted based on the user operation on the second button when a job for inspecting the quality of the printed product is selected from a job list displayed by the display and such that the print job is transmitted based on the user operation on the second button when registration of the reference image based on the registration job is performed.

2. The information processing apparatus according to claim 1, wherein the one or more controllers are configured to:
when the registration of the reference image finishes at the inspection apparatus, receive a completion notification from the inspection apparatus, and
in the job control, when the completion notification is received, control is performed such that the print job is transmitted based on the user operation on the second button.

3. The information processing apparatus according to claim 1, wherein the one or more controllers are configured to:
further perform display control of controlling the display by the display, and
in the display control, when the job for inspecting the quality of the printed product is selected from the job list displayed by the display, the second button is displayed as a button that is unable to be pressed.

4. The information processing apparatus according to claim 3, wherein
the button that is unable to be pressed is a grayed-out button.

5. The information processing apparatus according to claim 1, wherein
in the job control, control is performed such that the registration job is not transmitted based on the user operation on the first button when a job for not inspecting the quality of the printed product is selected from the job list displayed by the display.

6. The information processing apparatus according to claim 1, wherein
in the display control, when a job for not inspecting the quality of the printed product is selected from the job list displayed by the display, the first button is displayed as a button that is unable to be pressed.

7. The information processing apparatus according to claim 1, wherein
the job list displayed by the display includes one or more jobs, and whether to inspect the quality of the printed product or not is displayed for each of said one or more jobs.

8. A method for controlling an information processing apparatus configured to communicate with a printing apparatus and an inspection apparatus, the inspection apparatus being configured to inspect quality of a printed product obtained by performing printing by the printing apparatus, the information processing apparatus including a display configured to perform display on a screen, the method comprising:
receiving a selection of a job for inspecting the quality of the printed product from a job list displayed by the display; and
performing job control of, based on a user operation on a first button displayed by the display, transmitting a registration job for registering a reference image into the inspection apparatus, the reference image being an image to be used for inspecting the quality of the printed product, and based on a user operation on a second button displayed by the display, transmitting a print job to the printing apparatus,
wherein, in the job control, control is performed such that the print job is not transmitted based on the user operation on the second button when a job for inspecting the quality of the printed product is selected from the job list displayed by the display and such that the print job is transmitted based on the user operation on the second button when the reference image is registered.

9. An information processing apparatus configured to communicate with a printing apparatus and an inspection apparatus, the inspection apparatus being configured to inspect quality of a printed product obtained by performing printing by the printing apparatus, the information processing apparatus comprising:
a display configured to perform display on a screen;
a receiving interface configured to receive a user operation on the display; and
one or more controllers having one or more processors and one or more memories, the one or more controllers being configured to:
perform job control of,
when a user operation on a first button displayed by the display is received, transmitting a registration job for registering a reference image into the inspection apparatus, the reference image being an image to be used for inspecting the quality of the printed product, and
when a user operation on a second button displayed by the display is received, transmitting a print job to the printing apparatus, and
when a job for inspecting the quality of the printed product is selected from a job list displayed by the display, disable the user operation on the second button.

10. The information processing apparatus according to claim 9, wherein the one or more controllers are configured to:
when registration of the reference image based on the registration job is performed, enable the disabled user operation on the second button.

* * * * *